(12) United States Patent
Lin

(10) Patent No.: US 12,290,153 B2
(45) Date of Patent: May 6, 2025

(54) SUNSHADE MOUNTING STRUCTURE

(71) Applicant: Linhai Wuyang Outdoor Leisure Productse Co., Ltd., Linhai (CN)

(72) Inventor: Huijun Lin, Linhai (CN)

(73) Assignee: Linhai Wuyang Outdoor Leisure Products Co., Ltd., Linhai (CN)

( * ) Notice: Subject to any disclaimer, the term of this patent is extended or adjusted under 35 U.S.C. 154(b) by 0 days.

(21) Appl. No.: 18/256,108

(22) PCT Filed: Aug. 9, 2021

(86) PCT No.: PCT/CN2021/111379
§ 371 (c)(1),
(2) Date: Jun. 6, 2023

(87) PCT Pub. No.: WO2023/284043
PCT Pub. Date: Jan. 19, 2023

(65) Prior Publication Data
US 2024/0032659 A1   Feb. 1, 2024

(30) Foreign Application Priority Data

Jul. 6, 2021   (CN) .......................... 202121628319.0

(51) Int. Cl.
A45B 17/00   (2006.01)
A45B 23/00   (2006.01)
A45B 25/00   (2006.01)

(52) U.S. Cl.
CPC .............. *A45B 23/00* (2013.01); *A45B 17/00* (2013.01); *A45B 2017/005* (2013.01);
(Continued)

(58) Field of Classification Search
CPC ... A45B 23/00; A45B 17/00; A45B 2017/005; A45B 2023/0012; A45B 2023/0031;
(Continued)

(56) References Cited

U.S. PATENT DOCUMENTS 6,014,980 A * 1/2000 Glatz ..................... A45B 23/00
                                                          135/21
7,493,909 B2 * 2/2009 Ma ......................... A45B 23/00
                                                          135/21
(Continued)

FOREIGN PATENT DOCUMENTS

CN           2781858 Y * 6/2006 ............. A45B 17/00

OTHER PUBLICATIONS

PDF of English translation of the Written Opinion mailed Apr. 13, 2022 for PCT/CN2021/111379. (Year: 2022).*

*Primary Examiner* — Robert Canfield
(74) *Attorney, Agent, or Firm* — Wang Law Firm, Inc.

(57) ABSTRACT

A sunshade mounting mechanism comprises a first connecting sleeve (3); a second connecting sleeve (4) disposed on the top of the bearing rod (2); a pin shaft (5); the first connecting sleeve (3) is rotatably connected to the second connecting sleeve (4) through the pin shaft (5), and a center line of rotation of the first connecting sleeve (3) intersects with the transverse direction of the main rod (11); the bearing rod (2) has a first through hole (20) for allowing the pin shaft (5) to pass through. In this mounting mechanism, the mounting angle and position of the main rod relative to the bearing rod can be freely adjusted. The pin shaft is allowed to pass through the periphery of the top of the bearing rod on the basis of connecting the first connecting sleeve and the second connecting sleeve. In this way, the connection of the three components, i.e., the first connecting sleeve, the second connecting sleeve and the bearing rod can be achieved by only one pin shaft. The mounting mechanism is simplified, the connection strength can be greatly increased, and the service life is greatly prolonged.

7 Claims, 5 Drawing Sheets

(52) U.S. Cl.
CPC ............. *A45B 2023/0012* (2013.01); *A45B 2023/0031* (2013.01); *A45B 2023/0037* (2013.01); *A45B 2023/0075* (2013.01); *A45B 2023/0081* (2013.01)

(58) Field of Classification Search
CPC .... A45B 2023/0037; A45B 2023/0075; A45B 2023/0081
USPC ........................................ 135/20.1, 20.3, 21
See application file for complete search history.

(56) References Cited

U.S. PATENT DOCUMENTS

| | | | | |
|---|---|---|---|---|
| 7,614,413 B1* | 11/2009 | Ma | ................. | A45B 25/02 135/31 |
| 7,958,901 B2* | 6/2011 | Lai | ................. | A45B 23/00 135/20.3 |
| 9,232,836 B1* | 1/2016 | Zaccaro | ................. | A45B 23/00 |
| 9,237,785 B2* | 1/2016 | Ma | ................. | A45B 17/00 |
| 2002/0083969 A1* | 7/2002 | Tung | ................. | A45B 23/00 135/96 |
| 2006/0201542 A1* | 9/2006 | Ma | ................. | A45B 23/00 135/21 |
| 2008/0041431 A1* | 2/2008 | Tung | ................. | A45B 19/00 135/21 |
| 2009/0151759 A1* | 6/2009 | Glatz | ................. | A45B 23/00 135/20.1 |
| 2010/0037929 A1* | 2/2010 | Liu | ................. | A45B 19/04 135/20.3 |
| 2010/0192996 A1* | 8/2010 | Ma | ................. | A45B 25/10 135/20.1 |
| 2010/0206346 A1* | 8/2010 | Tung | ................. | A45B 23/00 135/20.1 |
| 2011/0005558 A1* | 1/2011 | Lai | ................. | A45B 17/00 135/20.1 |
| 2013/0333734 A1* | 12/2013 | Ma | ................. | A45B 17/00 135/20.1 |
| 2014/0230867 A1* | 8/2014 | Ma | ................. | A45B 17/00 135/20.1 |
| 2016/0015137 A1* | 1/2016 | Sasaki | ................. | A45B 11/00 135/20.1 |
| 2024/0032659 A1* | 2/2024 | Lin | ................. | E04H 15/34 |

* cited by examiner

SUNSHADE MOUNTING STRUCTURE

TECHNICAL FIELD OF THE INVENTION

The invention relates to the technical field of a sunshade, in particular to a sunshade mounting mechanism.

BACKGROUND OF THE INVENTION

As a kind of common outdoor items for shielding from the sun or rain, an outdoor foldable sunshade is usually unfolded to shield from the sun or rain in the case of rain or sufficient sunlight, and folded in the case of no rain or soft sunlight, without occupying extra space.

When existing cantilever sunshades are unfolded, the frame is generally located on one side of the bearing rod. A connecting piece is generally disposed at the joint of the bearing rod with the frame, so the weight of the whole frame is exerted on the bearing rod through the connecting piece. FIGS. 1 and 2 show the connecting structure of the existing connecting piece, the frame and the bearing rod. FIG. 1 shows an assembly between the connecting rod 4' of the frame 3' and the bearing rod 2' of the sunshade through the first connecting piece 11' and the second connecting rod 012, and FIG. 2 shows an assembly among the first connecting piece 11', the second connecting piece 012 and the top of the bearing rod 2'. As shown in FIG. 2, for the existing connecting structure, a first pin shaft 100 for achieving the relative rotation of the first connecting piece 11' and the second connecting piece 012 is located between the first connecting piece 11' and the second connecting piece to adjust the angle and position relationship between the connecting rod 4' of the frame and the bearing rod 2', and the second connecting piece 012 is inserted into the top of the bearing rod 2'. The bottom of the second connecting piece 012 is also inserted into the bearing rod 2' through a second pin shaft 200. The two pin shafts are clear in function division, under the design of one pin shaft the position of the frame can be freely adjusted, while under the design of the other pin shaft, it can ensure the mounting firmness of the connecting pieces with the bearing rod.

However, the sunshade with the design of the two pin shafts has the following disadvantages: on one hand, by using a plurality of pin shafts, the complexity of the structure is increased, and it is tedious in maintenance; on the other hand, since the sunshade is used outdoor throughout the year and exposed to the weather, the connecting pieces generally made of plastics are very prone to embrittlement in a severe environment, resulting in the deformation of the joint and the failure of the screw connection at the joint.

To sum up, it is necessary to further improve the existing mounting mechanism of a sunshade.

SUMMARY OF THE INVENTION

It is an object of the present invention to provide a sunshade mounting mechanism, which is simple in connection design and greatly enhanced in connection firmness.

For achieving the above object, the sunshade mounting mechanism for connecting a vertical bearing rod and a transverse main rod comprises: a first connecting sleeve disposed out of the main rod; a second connecting sleeve disposed on the top of the bearing rod; a pin shaft; wherein, the bearing rod has a first through hole for allowing the pin shaft to pass through; the first connecting sleeve is rotatably connected to the second connecting sleeve through the pin shaft, and a center line of rotation of the first connecting sleeve intersects with the transverse direction of the main rod.

To easily and effectively achieve the rotatable connection of the first connecting sleeve and the second connecting sleeve, preferably, the first connecting sleeve has two connecting arms extended downward respectively from one of the two sides of the first connecting sleeve on the extension direction of the mail rod, and each connecting arm has a second through hole for allowing the pin shaft to pass through; a top of the bearing rod and the second connecting sleeve sleeved outside the top of the bearing rod are located between the two connecting arms; the pin shaft passes through the connecting arms of the first connecting sleeve, the second connecting sleeve and the bearing rod, so as to make the first connecting sleeve rotatable around the pin shaft relative to the bearing rod and the second connecting sleeve.

The second connecting sleeve has various connection ways. Preferably, the bearing rod has an opening at the top of the bearing rod, the second connecting sleeve comprises a first sleeve covering the opening at the top of the bearing rod, and the first sleeve has a third through hole corresponding to the first through hole for allowing the pin shaft to pass through. Thus, with the design of the first sleeve, the opening of the bearing rod is completely covered, the contact area of the first sleeve with the bearing rod is increased, and the connection strength is ensured.

Preferably, the second connecting sleeve further comprises a second sleeve connected to and located below the first sleeve; the periphery of the second sleeve is at least partially protruded outward to form a plurality of steps for supporting the bottom of each connecting arm.

Preferably, each connecting arm has a plurality of reinforcing ribs formed on the surface of each connecting arm.

To avoid the first connecting sleeve from sliding relative to the main rod, preferably, a locking member is disposed on the main rod, and the locking member comprises a buckle for preventing the first connecting sleeve from moving relative to the main rod; the first connecting sleeve adjacent to the locking member, and the first connecting sleeve has a limiting groove for allowing the buckle to be locked inside located on the surface of the first connecting sleeve.

Preferably, the locking member further comprises an elastic member and a positioning ring sleeved on the main rod; a middle portion of the buckle is rotatably connected to a periphery of the positioning ring, the buckle is able to rotate around the middle portion of the buckle, and the rotation axis of the buckle is parallel to the pin shaft, so that two ends of the buckle are able to swing up and down relative to the main rod; the buckle has a tooth portion extending downward adjacent to the first connecting sleeve, the elastic member acts on the buckle to keep the tooth portion clamped tightly upon the limiting groove.

Compared with the prior art, the present invention has the following advantages. In this sunshade mounting mechanism, by rotatably connecting the first connecting sleeve to the second connecting sleeve through the pin shaft, the mounting angle of the main rod relative to the bearing rod can be freely adjusted, so that it is convenient to adjust the position of the frame relative to the bearing rod. In addition, with the design of the first through hole, the pin shaft is allowed to pass through the periphery of the top of the bearing rod on the basis of connecting the first connecting sleeve and the second connecting sleeve. In this way, the connection of the three components, i.e., the first connecting sleeve, the second connecting sleeve and the bearing rod can be achieved by only one pin shaft, without affecting the relative movement of the two connecting sleeves. Compared with the conventional connection mode using two pin shafts, the mounting mechanism is simplified, the connection strength at the joint can also be greatly increased, the excessive damage of the joint in the middle phase of the product life is effectively avoided, and the service life of the key components of the whole sunshade is prolonged greatly, so that the mounting mechanism is very practical.

DETAILED DESCRIPTION OF THE INVENTION

The present invention will be further described in detail with reference to the accompanying drawings by embodiments.

Figure 1:
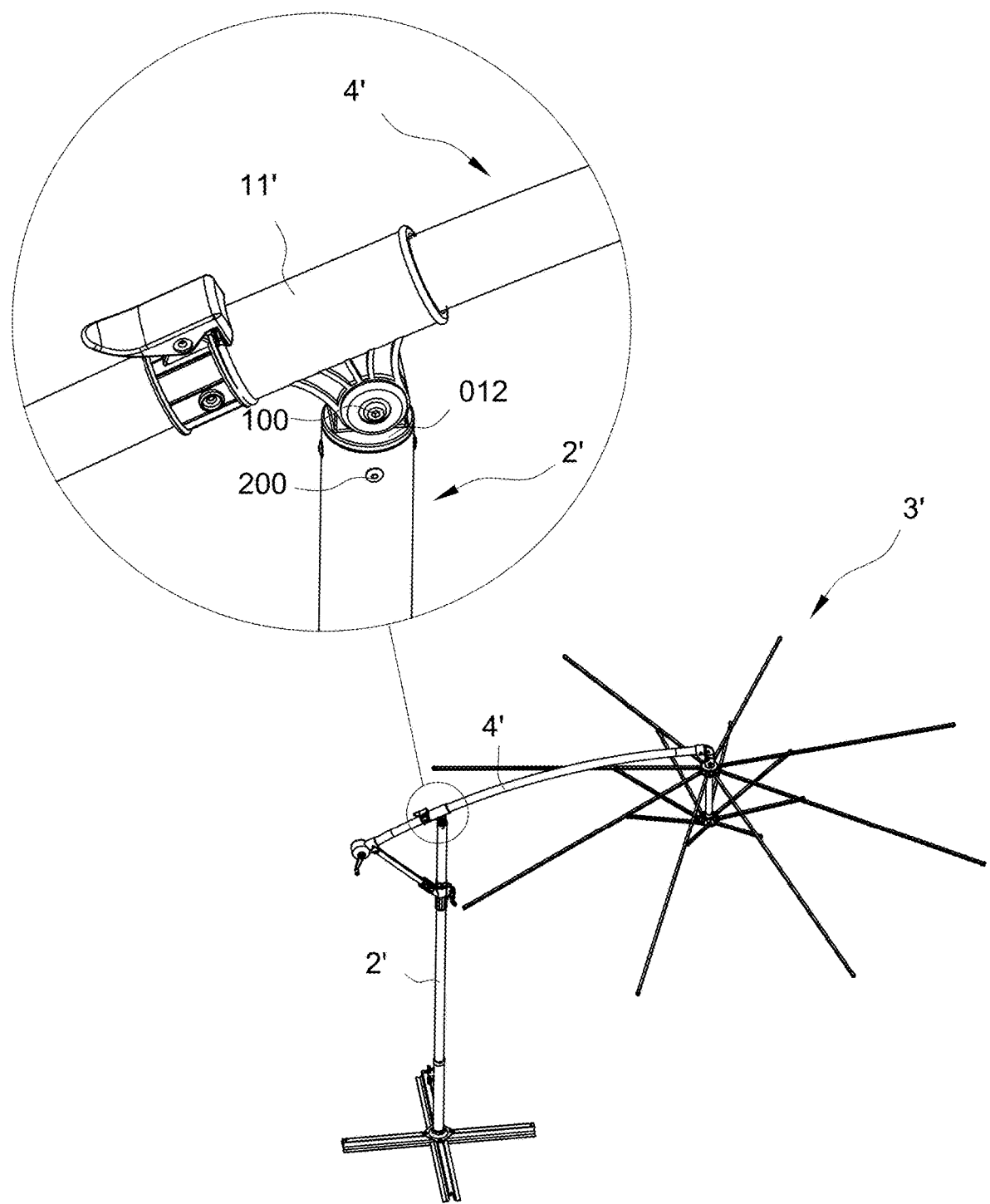
FIG. 1 is a perspective view of a connecting structure of an existing connecting piece, a frame and a bearing rod with an enlarged view.
Figure 2:
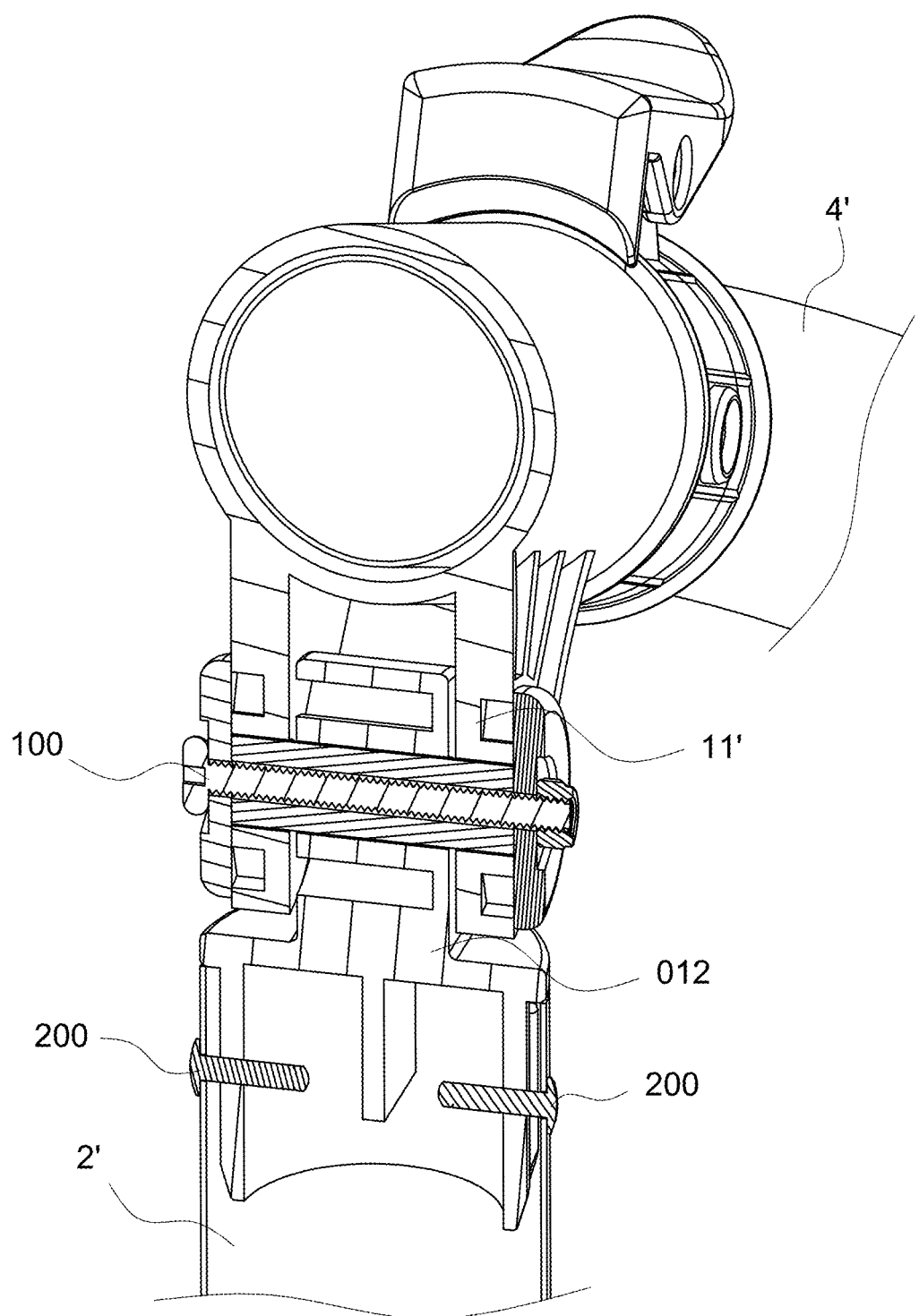
FIG. 2 is a sectional view of a part of FIG. 1.
Figure 3:
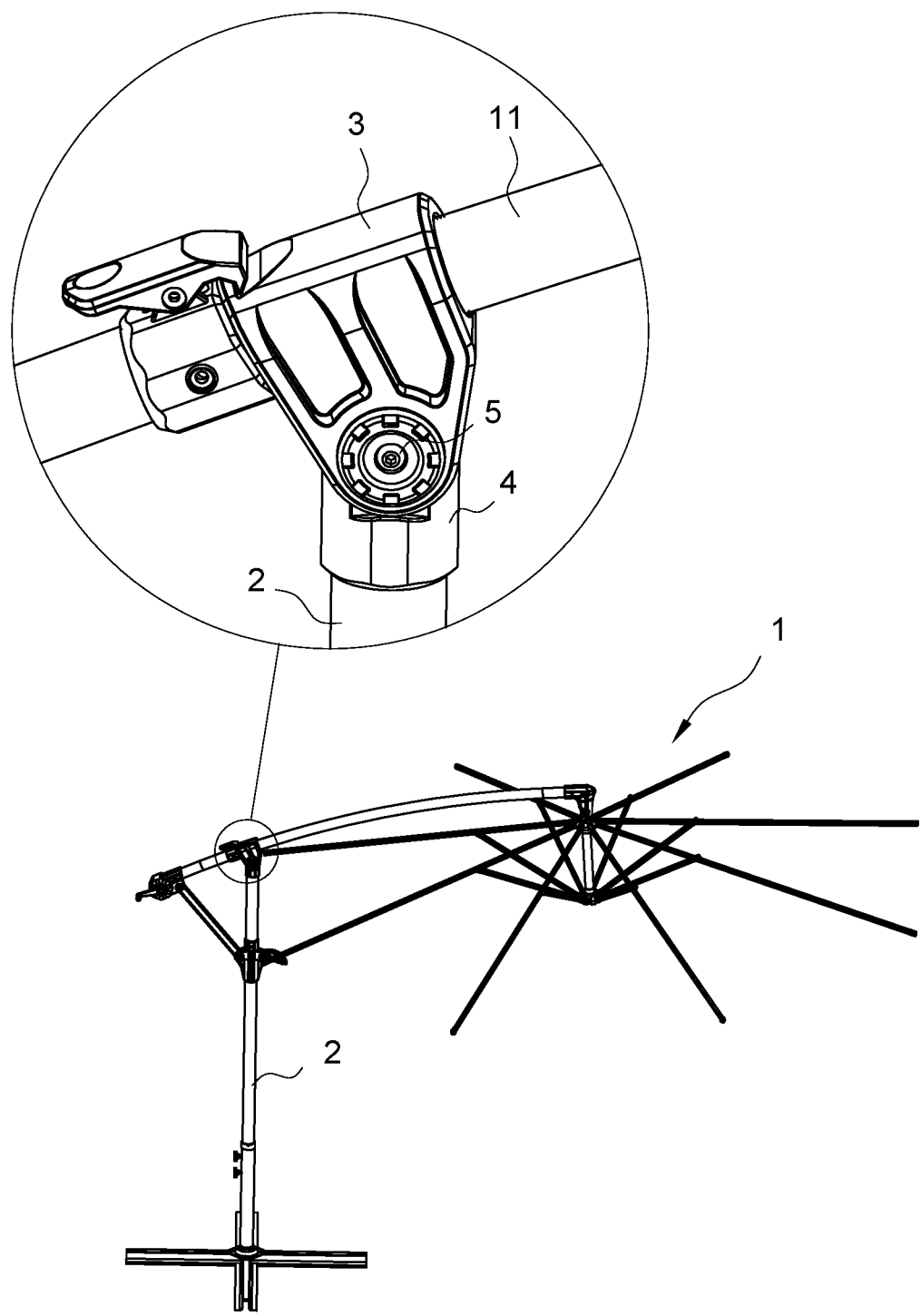
FIG. 3 is a perspective view of a sunshade according to an embodiment of the present invention (with an enlarged view)
Figure 4:
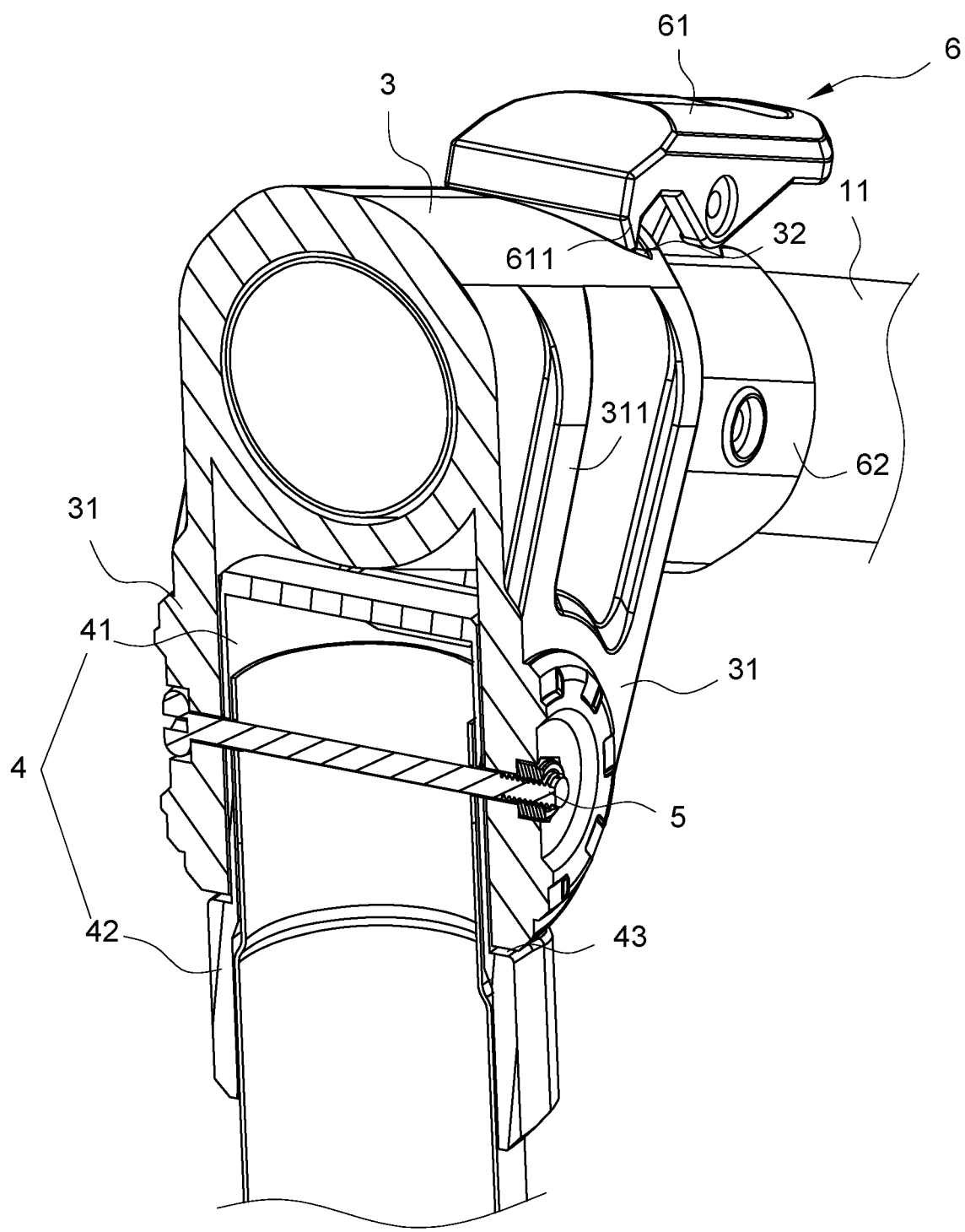
FIG. 4 is a sectional view of the enlarged view in FIG. 3.
Figure 5:
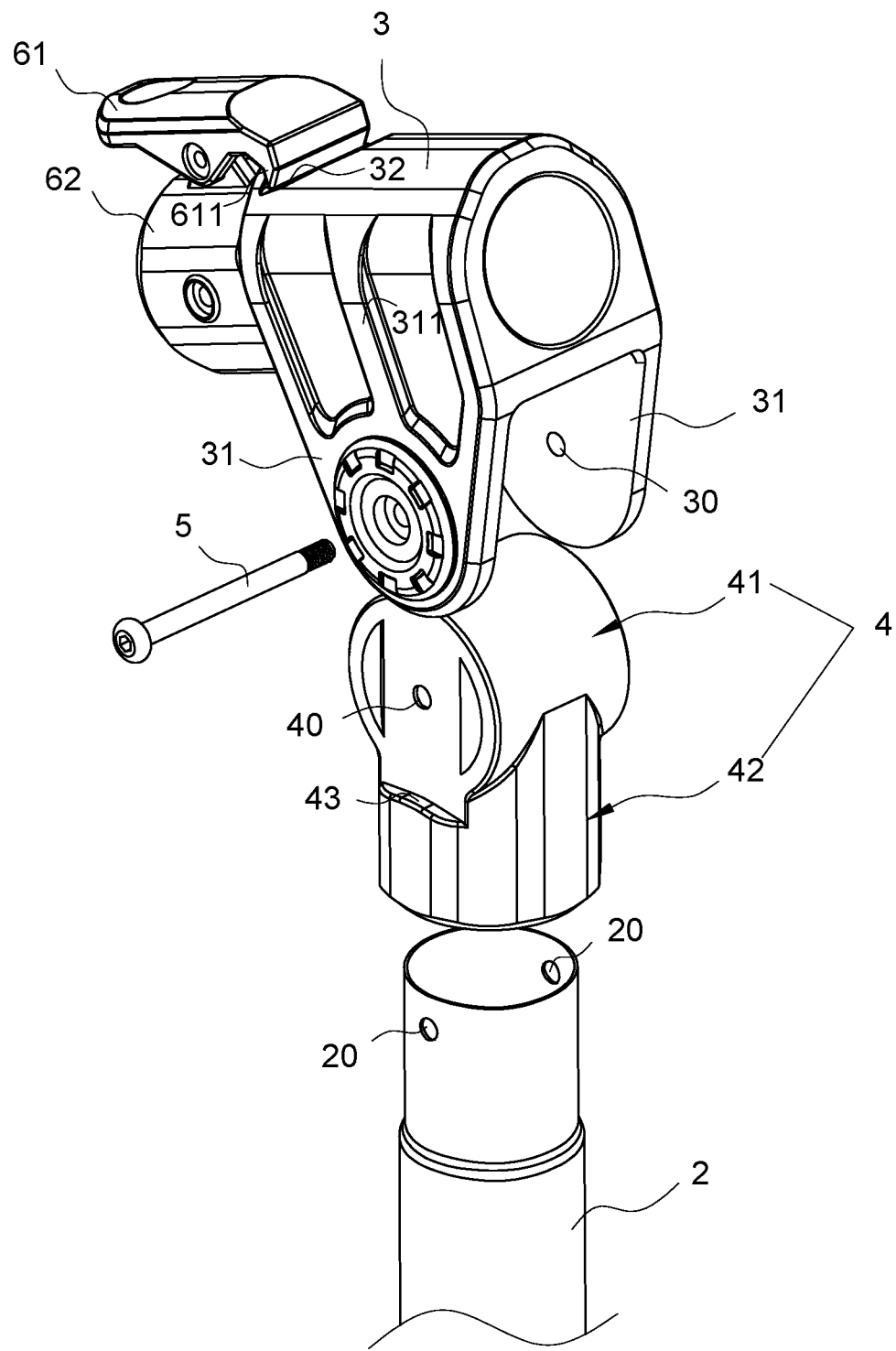
FIG. 5 is an exploded view of the whole mounting mechanism according to the embodiment of the present invention.

FIGS. 3-5 show a preferred embodiment of a sunshade with the mounting mechanism of the present invention.

In this embodiment, the sunshade is a kind of a diagonal-draw sunshade. As shown in FIG. 3, the sunshade comprises a frame 1, a vertical bearing rod 2, a transverse main rod 11, and a diagonal-draw rod 7. The frame 1 is suspended at a first end of the main rod 11, a second end of the main rod 11 extends backward to the top of the bearing rod 2, a middle portion of the main rod 11 is movably connected to the top of the bearing rod 2, and the top of the bearing rod 2 is supported below the main rod 11; one end of the diagonal-draw rod 7 is connected to the second end of the main rod 11, while the other end thereof is connected to the bearing rod 2 in such a way that this end can move up and down relative to the bearing rod 2; and, the rotation angle of the main rod 11 relative to the bearing rod 2 is adjusted by moving the diagonal-draw rod 7 up and down, so that the shading angle of the frame 1 at the first end of the main rod 11 is adjusted. Those are all the prior art and will not be described in detail here.

The sunshade mounting mechanism is disposed on the top of the bearing rod 2 to connect the middle portion of the main rod 11 to the bearing rod 2. The mounting mechanism according to the embodiment of the present invention comprises a first connecting sleeve 3, a second connecting sleeve 4 and a pin shaft 5.

The first connecting sleeve 3 is disposed out of the main rod 11, and the second connecting sleeve 4 is disposed on the top of the bearing rod 2. The first connecting sleeve 3 is rotatably connected to the second connecting sleeve 4 through the pin shaft 5, so that the main rod 11 and the bearing rod 2 can adjust the included angle and position relationship under the rotation of the first connecting sleeve 3 relative to the bearing rod 2 and the second connecting sleeve 4.

Since the frame 1 is connected to the first end of the main rod 11, to achieve angle adjustment, a center line of rotation of the pin shaft 5 intersects with the transverse direction of the main rod 11 in this embodiment. Of course, by using only the above rotation relationship, the first connecting sleeve 3 and the second connecting sleeve 4 cannot be stably supported on the bearing rod 2 when rotate. Thus, in this embodiment, the periphery of the bearing rod 2 has a first through hole 20 for allowing the pin shaft 5 to pass through. When the pin shaft 5 passes through the first connecting sleeve 3 and the second connecting sleeve 4, it also can pass through the periphery of the top of the bearing rod 2. In this way, by means of the supported bearing rod 2, the pin shaft 5 plays a role in both rotating and supporting. Under the gain of the top of the bearing rod 2, the joint is composed of the peripheral walls of the first connecting sleeve 3, the second connecting sleeve 4 and the support rod 2. In this connection form, the joint is simplified, and the strength at the rotation position is also enhanced.

Specifically, the first connecting sleeve 3 has two connecting arms 31 extended downward respectively from one of the two sides of the first connecting sleeve 3 on the extension direction of the main rod 11, and each connecting arm 31 has a second through hole 30 for allowing the pin shaft 5 to pass through. In a state where the first connecting sleeve 3 and the second connecting sleeve 4 are assembled, a top of the bearing rod 2 and the second connecting sleeve 4 sleeved outside the top of the bearing rod 2 are located between the two connecting arms 31. In this embodiment, each connecting arm 31 has a plurality of reinforcing ribs 311 formed on the surface of each connecting arm 31. Therefore, the pin shaft 5 passes through the connecting arms 31 of the first connecting sleeve 3, the second connecting sleeve 4 and the bearing rod 2 and then runs out from the hollow bearing rod 2, so as to make the first connecting sleeve 3 rotatable around the pin shaft 5 relative to the bearing rod 2 and the second connecting sleeve 4, and finally the main rod 11 can adjust the rotation angle relative to the bearing rod 2.

Of course, the second connecting sleeve 4 may have various forms. According to the embodiment of the present invention, the bearing rod 2 has an opening at the top of the bearing rod 2, the second connecting sleeve 4 comprises a first sleeve 41 covering the opening at the top of the bearing rod 2, and the first sleeve 41 has a third through hole 40 corresponding to the first through hole 20 for allowing the pin shaft 5 to pass through. Thus, with the design of the first sleeve 41, the opening of the bearing rod 2 is completely covered, the contact area of the first sleeve 41 with the bearing rod 2 is increased, and the connection strength is ensured. In addition, the second connecting sleeve 4 further comprises a second sleeve 42 connected to and located below the first sleeve 41; the periphery of the second sleeve 42 is at least partially protruded outward to form a plurality of steps 43 for supporting the bottom of each connecting arm 31.

According to the embodiment of the present invention, to avoid the first connecting sleeve 3 from sliding relative to the main rod 11 to lead to infirm mounting, a locking member 6 is disposed on the main rod 11, and the locking member 6 comprises a buckle 61 for preventing the first connecting sleeve 3 from moving relative to the main rod 11; the first connecting sleeve 3 adjacent to the locking member 6, and the first connecting sleeve 3 has a limiting groove 32 for allowing the buckle 61 to be locked inside located on the surface of the first connecting sleeve 3. The locking member 6 may have different structural forms. According to the embodiment of the present invention, the locking member 6 further comprises an elastic member and a positioning ring 62 sleeved on the main rod 11; a middle portion of the buckle 61 is rotatably connected to a periphery of the positioning ring 62, the buckle 61 is able to rotate around the middle portion of the buckle 61, and the rotation axis of the buckle 61 is parallel to the pin shaft 5, so that two ends of the buckle 61 are able to swing up and down relative to the main rod 11; the buckle 61 has a tooth portion 611 extending downward adjacent to the first connecting sleeve 3, the elastic member acts on the buckle 61 to keep the tooth portion 611 clamped tightly upon the limiting groove 32.

It should be noted that in this specification and claims of the present invention, the terms "front, back", "up, down", "left, right", "side, top, bottom", etc. to describe each particular structure and component are used for the purpose of facilitating the description of the invention and are based on a particular orientation in the accompanying drawings. Since the embodiments disclosed by the present invention can be set in different directions, these terms indicating directions are only used as explanations and should not be used as restrictions. For example, the verbs "up", "down" should not be limited to the direction opposite to or consistent with the gravity.

The invention claimed is:

1. A sunshade mounting mechanism, the sunshade comprising a vertical bearing rod (2) having a top and a transverse main rod (11), the mounting mechanism for connecting the bearing rod (2) and the main rod (11) comprising:

a first connecting sleeve (3) disposed out of the main rod (11);

a second connecting sleeve (4) disposed on the top of the bearing rod (2);

a pin shaft (5);

wherein, the bearing rod (2) has a first through hole (20) for allowing the pin shaft (5) to pass through;

the first connecting sleeve (3) is rotatably connected to the second connecting sleeve (4) through the pin shaft (5), and a center line of rotation of the first connecting sleeve (3) intersects with the transverse direction of the main rod (11).

2. The sunshade mounting mechanism of claim 1, wherein the first connecting sleeve (3) has two connecting arms (31) extended downward respectively from one of the two sides of the first connecting sleeve (3), and each connecting arm (31) has a second through hole (30) for allowing the pin shaft (5) to pass through;

a top of the bearing rod (2) and the second connecting sleeve (4) sleeved outside the top of the bearing rod (2) are located between the two connecting arms (31);

the pin shaft (5) passes through the connecting arms (31) of the first connecting sleeve (3), the second connecting sleeve (4) and the bearing rod (2), so as to make the first connecting sleeve (3) rotatable around the pin shaft (5) relative to the bearing rod (2) and the second connecting sleeve (4).

3. The sunshade mounting mechanism of claim 2, wherein the bearing rod (2) has an opening at the top of the bearing rod (2), the second connecting sleeve (4) comprises a first sleeve (41) covering the opening at the top of the bearing rod (2), and the first sleeve (41) has a third through hole (40) corresponding to the first through hole (20) for allowing the pin shaft (5) to pass through.

4. The sunshade mounting mechanism of claim 3, wherein the second connecting sleeve (4) further comprises a second sleeve (42) connected to and located below the first sleeve (41);

the periphery of the second sleeve (42) is at least partially protruded outward to form a plurality of steps (43) for supporting the bottom of each connecting arm (31).

5. The sunshade mounting mechanism of claim 4, wherein each connecting arm (31) has a plurality of reinforcing ribs (311) formed on the surface of each connecting arm (31).

6. The sunshade mounting mechanism of claim 5, wherein a locking member (6) is disposed on the main rod (11), and the locking member (6) comprises a buckle (61) for preventing the first connecting sleeve (3) from moving relative to the main rod (11);

the first connecting sleeve (3) adjacent to the locking member (6), and the first connecting sleeve (3) has a limiting groove (32) for allowing the buckle (61) to be locked inside located on the surface of the first connecting sleeve (3).

7. The sunshade mounting mechanism of claim 6, wherein the locking member (6) further comprises an elastic member and a positioning ring (62) sleeved on the main rod (11);

a middle portion of the buckle (61) is rotatably connected to a periphery of the positioning ring (62), the buckle (61) is able to rotate around the middle portion of the buckle (61), and the rotation axis of the buckle (61) is parallel to the pin shaft (5), so that two ends of the buckle (61) are able to swing up and down relative to the main rod (11);

the buckle (61) has a tooth portion (611) extending downward adjacent to the first connecting sleeve (3), the elastic member acts on the buckle (61) to keep the tooth portion (611) clamped tightly upon the limiting groove (32).

* * * * *